United States Patent
Jones

Patent Number: 5,995,677
Date of Patent: Nov. 30, 1999

[54] IMAGE PROCESSING SYSTEM

[75] Inventor: Simon David Jones, Hungerford, United Kingdom

[73] Assignee: Quantel Limited, Newbury, United Kingdom

[21] Appl. No.: 08/708,779

[22] Filed: Sep. 6, 1996

[30]    Foreign Application Priority Data

Sep. 8, 1995 [GB] United Kingdom .................. 9518443

[51] Int. Cl.⁶ .............................. G06K 9/36; G06K 9/42; G06K 9/40; H04N 1/393

[52] U.S. Cl. .......................... 382/276; 382/232; 382/248; 382/256; 382/260; 358/451

[58] Field of Search .................................... 382/232, 235, 382/248, 256, 260, 276; 358/451

[56]              References Cited

U.S. PATENT DOCUMENTS

| | | | |
|---|---|---|---|
| 4,805,129 | 2/1989 | David | 382/232 |
| 4,967,340 | 10/1990 | Dawes | 395/800.19 |
| 5,355,232 | 10/1994 | Kataoka | 358/451 |

FOREIGN PATENT DOCUMENTS

| | | | |
|---|---|---|---|
| 0368731 | 5/1990 | European Pat. Off. | G06F 15/66 |
| 0488388 | 6/1992 | European Pat. Off. | G11B 23/00 |
| 525996 | 2/1993 | European Pat. Off. | H04N 1/40 |
| 0609622 | 8/1994 | European Pat. Off. | G06F 15/62 |
| 644684 | 3/1995 | European Pat. Off. | H04N 1/409 |
| 2197766 | 5/1988 | United Kingdom | H04N 5/262 |
| 2231471 | 11/1990 | United Kingdom | H04N 5/262 |
| 2305052 | 3/1997 | United Kingdom | G06T 3/00 |

OTHER PUBLICATIONS

2244 Research Disclosure (1992) Mar., No. 335, Emworth, GB.

"Computer Graphics—Principals and Practice" by Foley, et al. 2nd Edition, published 1990 by Addison–Wesley, p. 529.

*Primary Examiner*—Phuoc Tran
*Assistant Examiner*—Daniel G. Mariam
*Attorney, Agent, or Firm*—Cooper & Dunham LLP

[57]                ABSTRACT

An image processing system for effecting a predetermined transformation to data representing a multiplicity of pixels which together form an initial image so as to create data representing a multiplicity of pixels which together form a transformed image in which each pixel is formed as a weighted combination of pixels in a respective block of data in the initial image. The system includes a controller operable for each pixel in the transformed image to identify the block of data containing all pixels in the initial image that contribute to the transformed image pixel, to divide the block into a plurality of sub-blocks comprising a plurality of rows of pixel data and plurality of columns of pixel data, and to calculate for each sub-block a set of transformation coefficients depending on the predetermined transformation. A transforming unit applies the respective transformation coefficients to each sub-block of data in order to produce an intermediate value for each sub-block, and an accumulator accumulates the intermediate values from the transforming unit such that once the transforming unit has applied the transformation coefficients to every sub-block in the initial image data block the accumulated value in the accumulator comprises the data defining the transformed image pixel. The controller is arranged for each sub-block to control the transforming unit to apply respective transformation coefficients to each row of pixel data in the sub-block one row at a time in order to produce data representing for each row a partial result and, once transformation coefficients have been applied to every row in the sub-block, to produce data representing a set of partial results, and to apply transformation coefficients to the set of partial results in order to produce the intermediate result.

17 Claims, 8 Drawing Sheets

IMAGE PROCESSING SYSTEM

The invention relates to an image processing system.

BACKGROUND TO THE INVENTION

Image processing can be used to apply special effects such as changes in size, position and/or perspective to an image. Such effects cannot be achieved realistically simply by moving image data around in a memory. In order to achieve realism it is often necessary to apply complex filtering and interpolation operations to the data held in memory.

An image processing system will generally comprise a store for storing data representing pixels forming an initial image and data representing pixels forming a modified image (to which the desired effect has been applied) and a processor for the addressing and the calculation of data to create the modified image. In a so-called read-side system the processor is arranged to calculate for each pixel in the modified image the addresses in the store at which data is stored representing initial image pixels that contribute to the modified image pixel. The processor also controls the combining of the thus addressed initial image pixel data to produce the modified image pixel data. The address calculation embodies the characteristic feature of the desired effect and the data calculation is necessary in order to produce a good quality result. Both calculations are therefore important in achieving the desired result.

The data calculations are usually performed using a digital filter. Filtering is necessary to ensure that the Nyquist sampling limit is satisfied in the modified image as well as in the initial image. FIG. 16 of the accompanying drawings shows a simple example of an effect in which an initial image 150 is reduced to one quarter the size in both the x and y directions to produce a modified image 151. The graph 152 illustrates an analog representation and the graph 153 illustrates a digital representation of a line 154 in the picture 150.

The line 155 in the reduced picture 151 is one quarter the length of the line 154. However, this does not mean that the data for the line 155 can be derived by taking every fourth sample of the data 153 of the line 154. If this is done the resulting data might look something like that represented by the graph 156 which clearly does not represent the line 155. It should be noted that the horizontal axis of graphs 152 and 153 are in the same scale as the line 154 whereas the graph 156 is in the same scale as the line 155. The horizontal line of graph 156 has been enlarged in scale for the purpose of clarity. It will be appreciated that in order to obtain representative samples of the reduced image along line 155 the sampling rate must be varied to obtain meaningful samples such as shown in graph 157 (which is to the same scale as graph 156).

Visually, sampling at the wrong frequency as represented by graph 156 would be seen as aliassing artifacts in the displayed image. Such artifacts are visually unpleasant but can be avoided by limiting the bandwidth of the initial image data so that the sampling frequency for the modified image does not exceed that limit. This is achieved by performing a calculation which low-pass filters the initial image data. Such filtering will remove the high frequency components of the initial image data that cannot be recreated in the modified image data.

In addition to filtering it is often necessary to interpolate the data representing the initial image in order to obtain a modified image free from aliassing artifacts in the form of jagged edges. Interpolation is necessary because for a pixel at a given position in the modified image the corresponding position in the initial image may be at a non-integer address. Since the initial image data is defined only at integer positions, the data required for a calculation must be derived by interpolating between the data at positions either side of the non-integer address. Filtering and interpolation can easily be combined in a digital filter simply by increasing the number of and varying the values of the coefficients using the filter so as to achieve the desired effect.

It will be appreciated from the foregoing that large amounts of image data are required to be processed in order to achieve a special effect. Operators of special effects machines expect to see the desired effect instantaneously or at lest with the minimum of delay-making it necessary to process the data at high speed.

The present invention aims to provide an improved image processing system.

According to one aspect of the invention there is provided an image processing system for effecting a predetermined transformation to data representing a multiplicity of pixels which together form an initial image so as to create data representing a multiplicity of pixels which together form a transformed image in which each pixel is formed as a weighted combination of pixels in a respective block of data in the initial image, the system comprising: a controller operable for each pixel in the transformed image to identify the block of data containing all pixels in the initial image that contribute to the transformed image pixel, to divide the block into a plurality of sub-blocks and to calculate for each sub-block a set of transformation coefficients depending on the predetermined transformation; a transforming unit for applying the respective transformation coefficients to each sub-block of data in order to produce an intermediate value for each sub-block; and a register for accumulating the intermediate values from the transforming unit such that once the transforming unit has applied the transformation coefficients to every sub-block in the initial image data block the accumulated value in the register comprises the data defining the transformed image pixel.

According to another aspect of the invention there is provided a method of filtering digital data representing a first plural-dimensional array of elements to produce data representing a second plural-dimensional array of elements, the method comprising: identifying for each element of the second array a plural-dimensional block of data comprising elements in the first array that contribute to the elements in the second array; dividing the identified block of data into a plurality of plural-dimensional sub-blocks of data; calculating for each sub-block a set of filtering coefficients; applying the filtering coefficients to respective elements in the sub-block in order to produce an intermediate value for each sub-block; and accumulating the intermediate values whereby, once the filtering coefficients have been applied respectively to every sub-block of the block of data, the accumulated value comprises the data of the elements.

According to a further aspect of the invention there is provided an image processing system comprising: a random access store having an address bus and a data bus; plural independent address generators for generating addresses and outputting the same onto respective address buses; an address bus multiplexer for selectively connecting the store address bus to the generator address buses; a data bus multiplexer for selectively connecting the store data bus to a plurality of other data buses; a pluarity of independent functional units connected to respective ones of the data busses for receiving data from the random access store via the data bus multiplexer; and a control computer for controlling operation of the address generators, the address and data bus multiplexers, and the functional units so as to optimise the addressing and transferring of data within the system.

The invention also provides a memory comprising a plurality of random access memory devices; a corresponding plurality of address calculators each connected to one of the random access memory devices; an address bus so connected in parallel to all of the address calculators that each address calculator receives the same address from the address bus; a data bus connected to all of the random access memory devices; and an address controller connected to provide to the address calculators control data from which each address calculator can calculate whether or not to pass the address to the random access memory device to which the address calculator is connected for the transfer of data between random access memory device and the data bus.

The invention further provides a method of testing a circuit comprising plural programmable logic devices which can be reprogrammed n-circuit, the method comprising programming one programmable logic device to execute a short circuit test by selecting at least three adjacent pins of the logic device as outputs, setting the outputs on the three selected pins at a high voltage, switching off the middle of the three pins, setting the outputs on the other two pins at a low voltage, selecting the middle of the three pins as an input, and examining the voltage on the middle pin.

The above and further features of the invention are set forthwith with particularity in the apended claims and together with advantages thereof will become clearer from consideration of the following details description of an exemplary embodiment of the invention given with reference to the accompanying drawings.

SUMMARY

The present disclosure relates to an image processing system for effecting a predetermined transformation to data representing a multiplicity of pixels which together form an initial image so as to create data representing a multiplicity of pixels which together form a transformed image in which each pixel is formed as a weighted combination of pixels in a respective block of data in the initial image. The system includes a controller operable for each pixel in the transformed image to identify the block of data containing all pixels in the initial image that contribute to the transformed image pixel, to divide the block into a plurality of sub-blocks comprising a plurality of rows of pixel data and plurality of columns of pixel data, and to calculate for each sub-block a set of transformation coefficients depending on the predetermined transformation. A transforming unit applies the respective transformation coefficients to each sub-block of data in order to produce an intermediate value for each sub-block, and an accumulator accumulates the intermediate values from the transforming unit such that once the transforming unit has applied the transformation coefficients to every sub-block in the initial image data block the accumulated value in the accumulator comprises the data defining the transformed image pixel. The controller is arranged for each sub-block to control the transforming unit to apply respective transformation coefficients to each row of pixel data in the sub-block one row at a time in order to produce data representing for each row a partial result and, once transformation coefficients have been applied to every row in the sub-block, to produce data representing a set of partial results, and to apply transformation coefficients to the set of partial results in order to produce the intermediate result.

DETAILED DESCRIPTION OF AN EMBODIMENT OF THE INVENTION SYSTEM OVERVIEW

Figure 1:
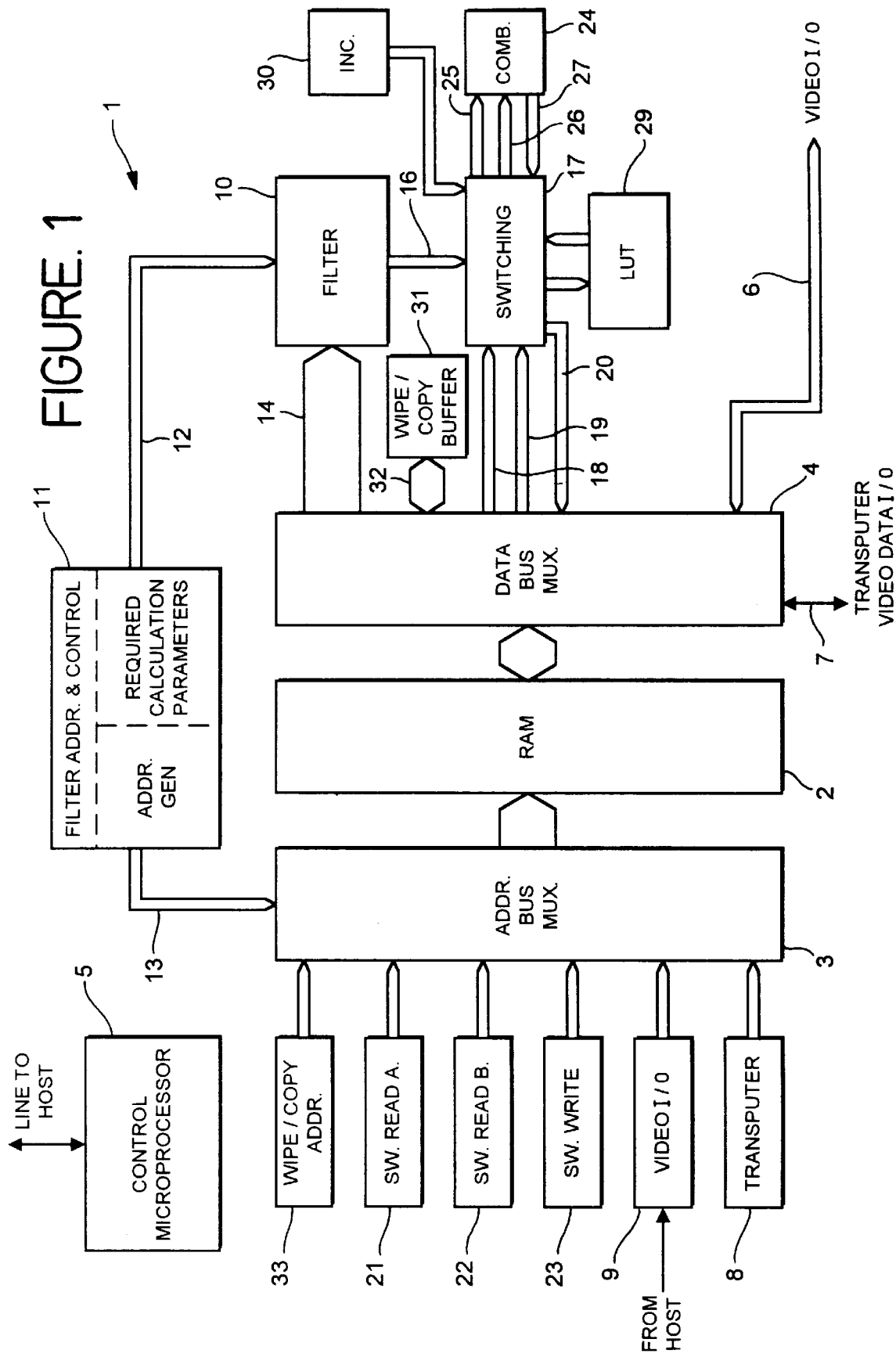
FIG. 1 is a schematic functional block diagram of a system embodying the invention.

Turning now to FIG. 1 of the accompanying drawings there is shown an image processing system 1 comprising a RAM store 2 which is addressed by an address bus multiplexer 3 and receives and outputs data via a data bus multiplexer 4. The RAM store 2 may be of any convenient size suitable for storing data representing plural images. For example, in a video processing system a store one Mpixel capacity will enable data representing approximately 2.5 video frames to be stored for processing.

Efficient storage of image data within the RAM store 2 is achieved by utilising the one dimensional storage technique described in our British Patent application published as GB-A-2269291 (corresponding to U.S. patent application Ser. No. 08/097950 the teachings of which are incorporated herein by reference). Since the data represents a two dimensional colour image, it is easier to understand the manipulation of two dimensional image data than it is to understand the manipulation of the same data in the form of a one dimensional list. Therefore, for the sake of clarity the following description will refer to two dimensional data. It should, however, be remembered that the image data is in fact stored as a one dimensional list in the RAM store 2.

Overall operation of the system 1 is controlled by a control microprocessor 5 which is itself controlled by a host computer (not shown). Video data is input to and output from the system 1 via a video I/O bus 6. The transfer of video data is controlled directly by the host. A video I/O address generator 9 is provided to generate addresses in response to commands from the host for input to the address multiplexer in order to control the transfer of video data between the RAM store 2 and the video I/O bus 6 via the data multiplexer 4.

The system 1 further comprises a filter 10 which is controlled by a filter controller 11 under the supervision of the control microprocessor 5. As will be described in greater detail hereafter, the filter 10 enables transformations to be applied to data from the RAM store 2 such that the image represented thereby appears to be changed in size, shape and/or position. The filter controller 11 provides calculation parameters to the filter 10 via a data bus 12 and controls the addressing of data in. the RAM store 2 via an address bus 13. The filter 10 receives image data to be transformed from the RAM store 2 via the data multiplexer 4 and a dedicated data bus 14. Transformed data is output from the filter 10 via a bus 16 to a switching circuit 17.

The switching circuit 17 is connected to the data multiplexer to receive data therefrom via two buses 18, 19 and to input data thereto via input bus 20. The outputting of data onto the data bus 18 is controlled by a first switch read address generator 21, and the outputting of data onto the data bus 19 is controlled by a second switch read address generator 22. Similarly, the inputing of data from the switching circuit 17 to the RAM store 2 is controlled by a switch write address generator 23. The three address generators 21 to 23 are connected to input address data to the address multiplexer 3 via respective address buses. The switching circuit 17 is also connected to a combiner 24 via three buses 25 to 27 which enable data representing two images to written to the combiner and data representing a single combined image to be read from the combiner. Each of the buses 18, 19, 20 and the buses 25, 26 and 27 have sufficient bandwidth to carry data representing both the luminance (Y) and chrominance (U,V) of the image and data representing a key or control image associated with the image.

The switching circuit 17 is also connected to a look up table 29 that can be utilised to store data for any operation which may be defined suitably by a look up table. For example the key compensation techniques in our British Patent application published as GB-A-2256557 (corresponding to U.S. patent application Ser. No. 07/880236 the teachings of which are incorporated herein by reference), can conveniently be defined as a set of data in a look up table. The well known technique of so-called unsharp masking or USM, a conditional edge enhancement technique used in image printing is also well suited to being defined in a look up table. The look up table 29 may be used to store data for use in these techniques if so desired.

The system also comprises an incrementer 30 connected to the switching circuit 17. The incrementer 30 can be used to provide computer generated data for a variety of purposes. For example, the incrementer 30 may be used to provide a key which keys a fixed colour over an image, say, to create a coloured border around the image. The creation of a border can of course be achieved by defining an image of the border in the RAM store 2 and then combining the border with the image that the border is to surround. However, such an approach is wasteful of memory. The border can be defined by a few simple definitions in a run length encoded format and be generated simply by following those definitions. The incrementer 30 enables such definitions to be utilised efficiently in the system 1.

The system also comprises a wipe/copy buffer 31 connected to the data multiplexer 4 via its own data bus 32. An associated wipe/copy address generator 33 is connected to the address multiplexer and is operable to generate addresses during a wipe/copy operation. The wipe/copy buffer 32 enables data in the store to be quickly changed. In a wipe operation data representing a desired colour, say black, is held in the wipe/copy buffer 31. The address generator addresses in turn each store location in which data for a selected image or portion of an image is stored and the contents of the address locations are replaced by data held in the wipe/copy buffer 31. In a copy operation a portion of image data in the RAM store 2 is addressed by the wipe/copy addressed generator 33 in a first cycle and read to the wipe/copy buffer. In the next cycle the wipe/copy address register 33 addresses a different portion of the RAM store 2 and the data in the wipe/copy buffer is written to that address portion of the RAM. The process is repeated until data for the entire image or a portion thereof has been copied to another portion of the RAM store 2.

Storing Image Data

Figure 2:
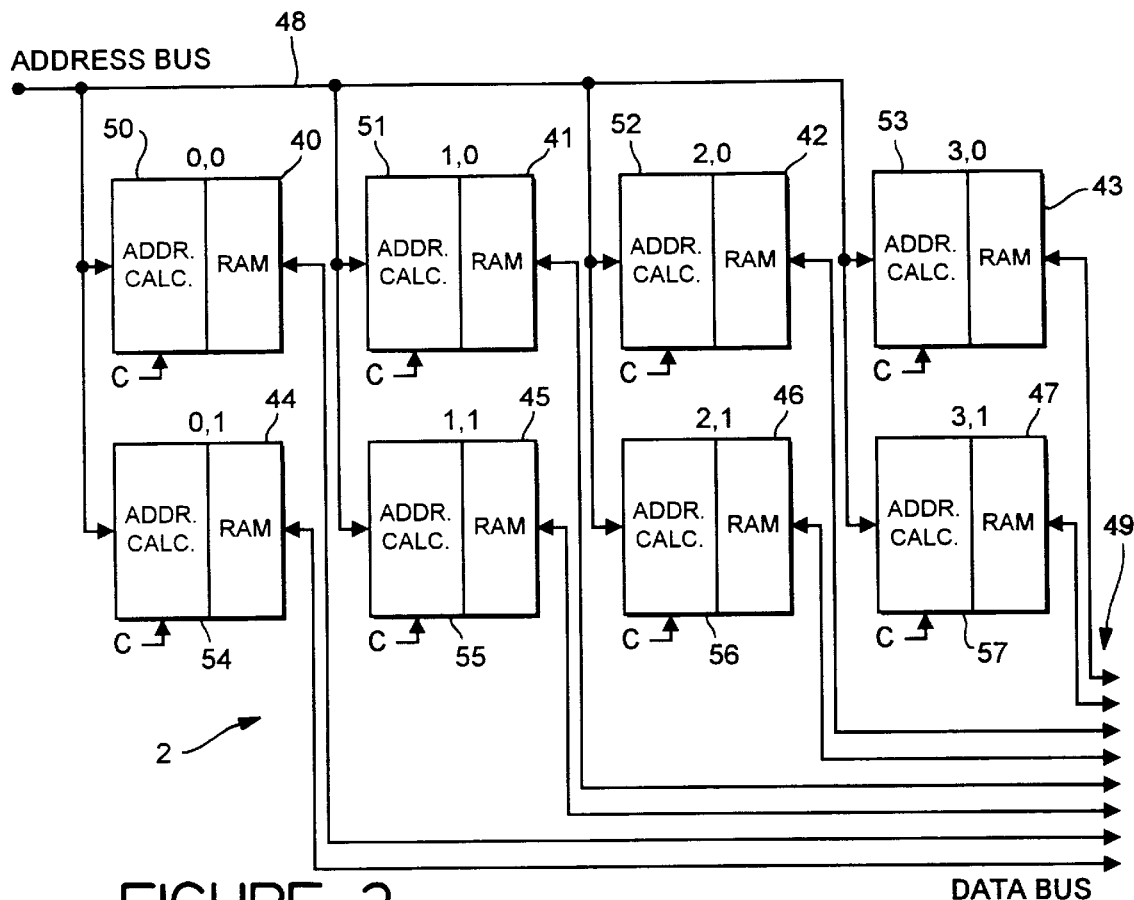
FIG. 2 is a schematic functional block diagram of a random access memory store used in the system of FIG. 1.

As shown in FIG. 2 of the accompanying drawings the RAM store 2 comprises several individual RAM devices 40 to 47 which are addressed simultaneously by an address bus 48 from the address bus multiplexer 3 (see FIG. 1) and which transfer data in parallel over a data bus 49 comprising for each RAM device a respective individual data bus connected to the data bus multiplexer 4 (see FIG. 1). Each RAM device 40 to 47 has an associated address calculator circuit 50 to 57 which receives address data from the address bus 48 and calculates from that address data the specific address in the associated RAM device at which the required image data is stored. For the purpose of explanation each address calculator/RAM unit will be identified in the following by a (column, row) coordinate. Thus, for example, the RAM device 40 will be identified by the coordinate (0,0) because it is in the column numbered zero row of the row numbered zero and RAM device 47 will be identified by the coordinate (3,1) because it is in the column numbered three of the row numbered one.

Figure 3:
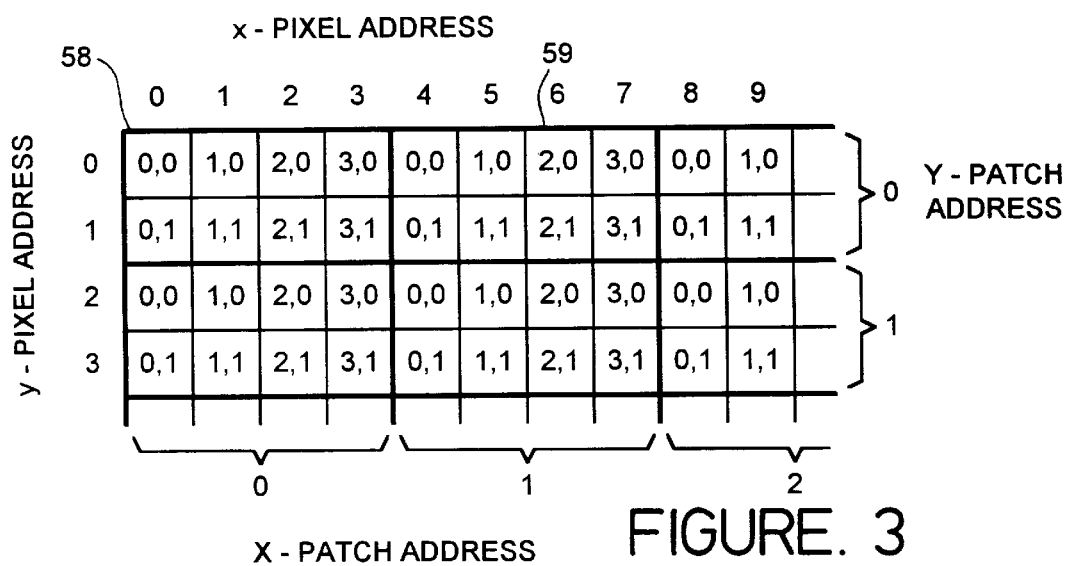
FIG. 3 is a chart representing how image data is stored in the store of FIG. 2.

FIG. 3 of the accompanying drawings illustrates how pixel data for a portion of the picture is distributed among the eight RAM devices 40 to 47. Each pixel has an x,y coordinate defining its position in the image. The pixel numbered zero in the row numbered zero of the image is stored in RAM (0,0). The pixel numbered 1 in the row numbered zero is stored in RAM (1,0) the pixel numbered two is stored in RAM (2,0) and the pixel numbered three is stored in RAM (3,0). This storing pattern is repeated for pixels numbered 4 to 7, pixels numbered 8 to 11 and so on along the entire line numbered zero in the image. The pixels in the next line of the image, ie the line numbered one, are similarly stored in the RAMS 44 to 47. The pixel numbered zero in the row numbered one is stored in RAM (0,1), the pixel numbered one is stored in RAM (1,1), the pixel numbered two is stored in RAM (2,1) and the pixel numbered three is stored in RAM (3,1). This storing pattern is repeated along each and every line in the image.

It can be seen from FIG. 3 that the result of storing the pixel data in the RAM devices 40 to 47 in this manner is to divide the picture into image blocks each comprising 4×2 pixels. The pixel data in each 4×2 block is stored at the same address in the respective RAM device. Each RAM device 40 to 47 holds the pixel data for one eighth of the image, ie every fourth pixel horizontally from every other line vertically. Therefore, if the same (X,Y) patch address is presented to all eight RAM devices 40 to 47 a contiguous block, say block 58, of 4×2 pixels will be output. If the X patch address is incremented by one and the (X,Y) patch address is then applied again to each of the RAM devices 40 to 47, then the next block 59 of 4×2 pixels will be output onto the data bus 49. It will be appreciated that the above described storing and addressing of data increases the speed at which the data can be accessed in the RAM store by a factor of eight. In most situations it is necessary to transfer data representing an entire image to and from the store. In such situations the data is simply addressed in patch scan order starting with the patch at (X,Y) patch address (O,O) and continuing along the line of patches at (1,0), (2,0) and so on until every patch in every patch line has been addressed in the store.

Figure 4:
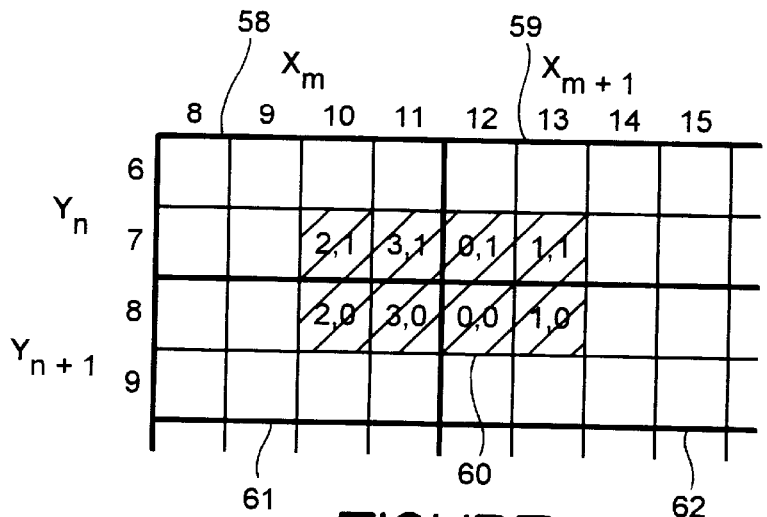
FIG. 4 shows a desired block of data in the image data stored in the store.

However, during operation of the filter 10 only relatively small blocks of data will be required at any given time to be transferred to and from the RAM store. In such filtering operations the filter 10 may require access to any contiguous block of pixel data which may or may not coincide with one or more patches 58, 59 in the RAM store 2. FIG. 4 of the accompanying drawings shows a worst case situation where a 4×2 block of data 60 overlaps four adjacent patches 58, 59, 61, 62 in the RAM store 2. One way of reading the required data for the block 60 from the RAM store 2 would be to apply the (X,Y) patch address for the four patches 58, 59, 61, 62 overlapped by the block 60 in consecutive read cycles and to discard from each patch the data not required for the block 60. This approach has two disadvantages. Firstly, it is slow because it takes four read cycles to obtain the data for a block equivalent in size to one RAM patch. Secondly, it is wasteful of bandwidth on the data bus, because for each patch of data 58, 59, 61, 62 read from the store pixel data corresponding to six out of the eight pixels in the patch is discarded.

This problem is solved by the filter controller 11 sending the four patch addresses $(X_m, Y_n)$, $(X_m, Y_{n+1})$, $(X_{m+1}, Y_n)$ and $(X_{m+1}, Y_{n+1})$ over the address bus 48 to all of the address calculators 50 to 57 (see FIG. 2) and sending other control data directly to each of the address calculators 50 to 57 via a control line C. The control data enables each address calculator to determine which pixel data are required from its associated RAM device. The filter control unit 11 first determines which RAM devices 40 to 47 require which patch addresses $(X_m, Y_n)$ to $(X_{m+1}, Y_{n+1})$. To do this, the filter control unit 11 begins by determining the location in terms of pixel addresses in each of the pixels comprising the required block. In FIG. 4 the top left hand pixel of the required block is at pixel address (10, 7). The patch address $(X_m, Y_n)$ is determined by dividing the x coordinate of the pixel address by 4, giving a result of 2 remainder 2, and dividing the pixel y coordinate by 2 giving a result of 3 remainder 1. The patch coordinate $(X_m, Y_n)$ in which the top left hand pixel of the required block is located is therefore (2, 3) and the RAM which should receive that address is determined by the remainders as being at RAM coordinate (2, 1). Calculations are similarly performed by the filter control unit 11 for each of the pixels in the required patch 60. Once all of the patch addresses $(X_m, Y_n)$ to $(X_{m+1}, Y_{n+1})$ have been determined they are sent down the address bus 48.

Figure 5:
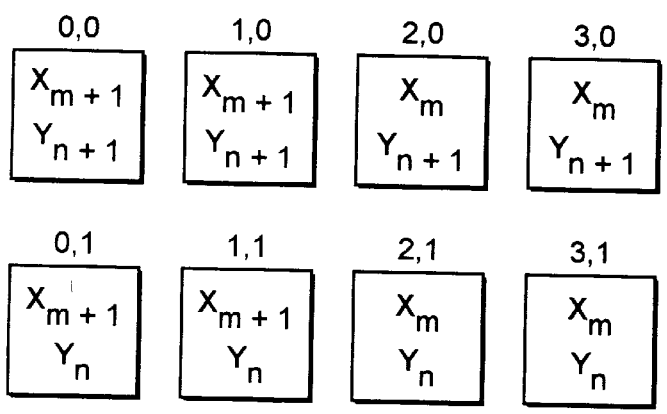
FIG. 5 shows how addresses are distributed among RAM devices comprising the store of FIG. 2.
Figure 6:
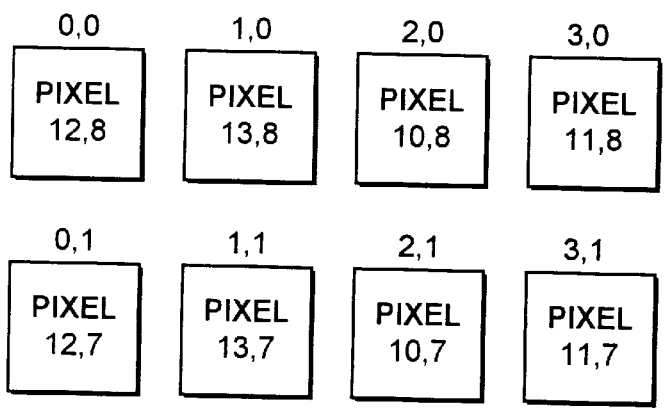
FIG. 6 shows how a block of data is stored in the RAM devices of the store in FIG. 2.

At the same time, control data derived from the remainders is output to the appropriate ones of the address calculators 50 to 57 via their respective control lines C. As represented by the boxes in FIG. 5 of the accompanying drawings this enables each address calculator to acquire the appropriate address data from the address bus 48. As shown in FIG. 6 of the accompanying drawings, applying the thus distributed patch addresses to the appropriate RAM devices 40 to 47 will cause the devices to output the required pixel data, as shown in FIG. 6 of the accompanying drawings, onto the data bus 49 for output via the data multiplexer 4 to the filter 10 (see FIG. 1).

Figures 7, 8:
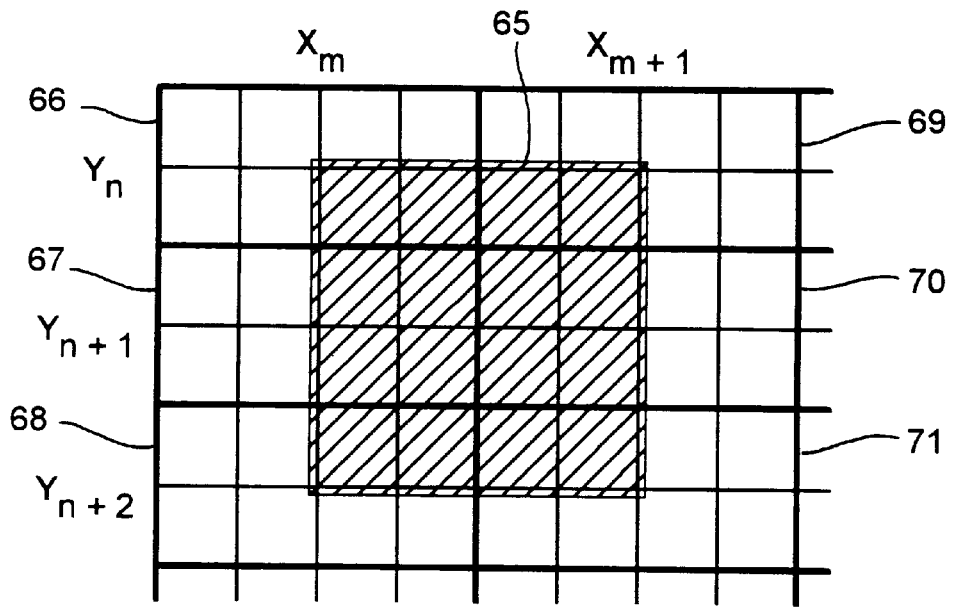
FIG. 7 represents a large block of desired data in the image data stored in the store of FIG. 2.
FIG. 8 represents the storing of a line of luminance and chrominance values in the store.

As will be explained in greater detail hereinbelow, the image data is filtered by the filter 10 in blocks of 4×4 pixels. By selecting RAM devices that have a short access time it is possible to address two different storage locations in a single read or write operation of the system. The use of such fast RAM devices enables a required block of data to be defined as a block 65 of 4×4 pixels and transferred to or from the RAM store in a single read or write operation of the system. As shown in FIG. 7 of the accompanying drawings, since the required block 65 comprises 4×4 pixels it can overlap up to six adjacent patches 66 to 71. The filter control unit 11 is therefore arranged to calculate the extra patch coordinates $(X_m, Y_{n+2})$ and $(X_{m+1}, Y_{n+2})$ in addition to the four patch coordinates previously mentioned. Suitable remainders are determined by the filter control unit 11 and distributed to appropriate ones of the address calculators 50 to 57 so that each address calculator can receive two patch address to enable data for two pixels to be output from the corresponding RAM device so as to form the required block 65 of 4×4 pixels.

Storing Luminance and Chrominance Data

The image is defined in terms of its luminance (Y), chrominance (U,V) and stencil (K) values. Luminance and chrominance data are coded in accordance with the CCIR601 standard in which the Y luminance is sampled at 13.5 MHz and the U,V chrominance are each sampled at 6.75 MHz and are co-sited with one of the luminance samples. (As used herein the symbols U and V are intended to correspond with the symbols Cr and Cb used in the CCIR601 standard). The stencil is sampled at the same rate as the luminance signal, namely 13.5 MHz. The different sampling rates between luminance and chrominance means that there is not an exact correspondence between the two sets of data. Every chrominance value $(U_0, V_0)$ is shared between two luminance values $Y_0$ and $Y_1$. That is to say, each luminance value shares a chrominance value with its neighbour. Luminance data, chrominance data and stencil data are each stored in separate RAM stores or different areas of the one RAM store.

In order to avoid the addressing problems that this storing of chrominance data could otherwise cause, the chrominance data is not stored in the RAM store in the order in which it is acquired. FIG. 8 shows the manner in which luminance and chrominance data is stored in respective portions 74 and 75 of the store. For the sake of clarity only a single line of luminance and chrominance data is shown, but it should be noted that the data is in fact stored in the manner shown in FIG. 3, the storing pattern simply being repeated for each line in the image.

As shown in FIG. 8 of the accompanying drawings a line of luminance (Y) samples $Y_0, Y_1, Y_2$, etc are stored in scan order in the first RAM portion 74. Luminance value $Y_0$ is stored in RAM (0,0), luminance value $Y_1$ is stored in RAM (1,0) and so on, the pattern repeating for every fourth pixel of every. line in keeping with the arrangement showing in FIG. 3. The corresponding line of chrominance (U,V) samples are separated into their individual U and V values for storage in the second RAM portion 48. The U chrominance samples are stored in sample order in blocks of four samples. Thus, $U_0$ is stored in RAM (0,0), $U_1$ stored in RAM (1,0), $U_2$ is stored in RAM (2,0) and $U_3$ is stored in RAM (3,0). The V chrominance samples, however, are stored in the RAMs (0,0) to (3,0) in the order $V_2, V_3, V_0, V_1$.

This is done to facilitate the reading of data from the RAM store 2. If data was only to be read from the store in raster scan order then the chrominance data could simply be stored in the order $U_0$, $V_0$, $U_1$, $V_1$ and so on. However, during filtering operations the U and V chrominance values are filtered separately and storing the chrominance data in the order $U_0$, $V_0$, $U_1$, $V_1$ makes it difficult to read a 4×4 block of only U values or only V values. Separating the U and V values as discussed above but storing both the U values and the V values in scan order would solve the problem of reading data for filtering but would cause problems during a raster scan operation. Storing both U and V in scan order would require a single RAM device to be read twice to extract corresponding U and V values. That is, it would be necessary to read RAM (0,0) twice to obtain the values of $U_0$, $V_0$ and so on. However, by arranging the chrominance data as shown it is possible to ensure that data representing a only single U or V value is only ever required to be read from each of the RAMs. Once the chrominance data has been acquired it is a simple task to rearrange it into the correct order. It will be appreciated that the reordering of data can be applied to either the U or the V chrominance data. It will also be appreciated that the above comments apply equally to both the reading of data from and the writing of data to the RAM store 2. The reordering of the data is controlled by the data bus multiplexer 4 under the control of the microprocessor 5.

Image Data Filtering

Figure 9:
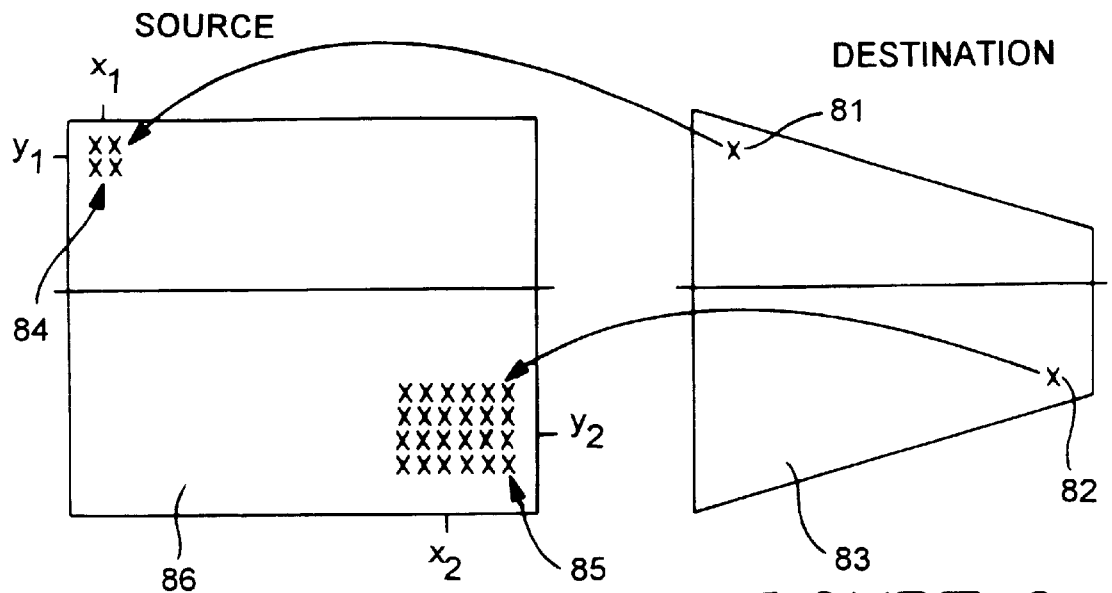
FIG. 9 is a schematic diagram showing the relationship between a source image and a destination image.

In a video effects system stored digital data representing an initial two dimensional image is manipulated to produce digital data representing the image as if it has been moved in space, enlarged, shrunk, distorted, etc. In the system 1 the initial image is stored in a random access source portion of the RAM store and the manipulated data representing the modified version of the image is stored in a destination portion of the RAM store. As shown in FIG. 9 of the accompanying drawings, for each pixel 81, 82 in the destination image 83 there is a corresponding patch 84, 85 of one or more pixels in the source image 86 from which the pixels are derived. The effect shown in FIG. 9 is a perspective distortion in which the right hand side of the image is compressed to a greater extent than the left hand side of the image. For the pixel 81 at the left hand side of the image only a small number of source pixels, say 2×2, , in the source image need be processed in order to obtain a value for the destination pixel 81. However, for the pixel, 82 at the right hand side of the destination image 83 a larger patch of pixels, say 6×4, needs to be processed in order to obtain a value for the destination pixel 82.

In order to determine which pixels in the source image 86 should contribute to a given pixel in the destination image 83, the address of the destination pixel is transformed back into a (x,y) position in the source image. If the (x,y) coordinate corresponds exactly with an integer coordinate in the source image then there may be a one to one correspondence between the source and destination pixels. However, in an effect such as the perspective distortion shown in FIG. 9 it is likely that the (x, y) coordinate in the source store will not coincide exactly with an integer coordinate and that the destination pixel will not correspond exactly with a single source pixel, but will instead correspond with a number of pixels in the source image. The number of source pixels required to contribute to a given destination pixel will depend on the degree of effect. Small changes will require contributions from only a few source pixels in the vicinity of the coordinate, whereas large changes will require contributions from a larger number of source pixels in the vicinity of the source coordinate.

Digital Filtering

The filter referred to herein is a digital image filter comprising a finite impulse response (FIR) filter. Such filters are normally embodied in dedicated hardware in order to be able to achieve the high speed operation that is required in image processing. Hitherto, the approach to filter hardware design has been to determine the largest block of data on which the filter will be required to operate and then to build a filter of sufficient size to accommodate that amount of data. This approach has several disadvantages. The filter hardware is only fully utilised when it is operating on the largest block of data. The majority of filter operations will involve processing smaller blocks of data and therefore in the majority of filtering operations the filter hardware will be under utilised. This is wasteful of hardware and is expensive both financially and in terms of the use of space on the circuit board containing the filter. Such a design is also inflexible. If a new processing operation is developed requiring a block of data larger than the maximum capacity of the filter, then the filter will not be able to perform the operation and new hardware will have to be designed and installed in the system.

Image processing, of course, requires filtering in two dimensions (x and y) in order to achieve the desired result. The usual approach is to build a two dimensional filter using a number of similar or identical filtering units which are simply connected together to form a filter of the desired size. In a two dimensional filter the number of coefficients used in the filtering operation increases rapidly with the size of the filter. Generally, unless some amplification or attenuation of the image is required, the sum of the coefficients in every filter operation will be unity. As the size of the filter increases the value of each coefficient will be reduced and consequently the accuracy to which the coefficient is defined must be increased. The filter 10 mitigates these problems.

Figure 10:
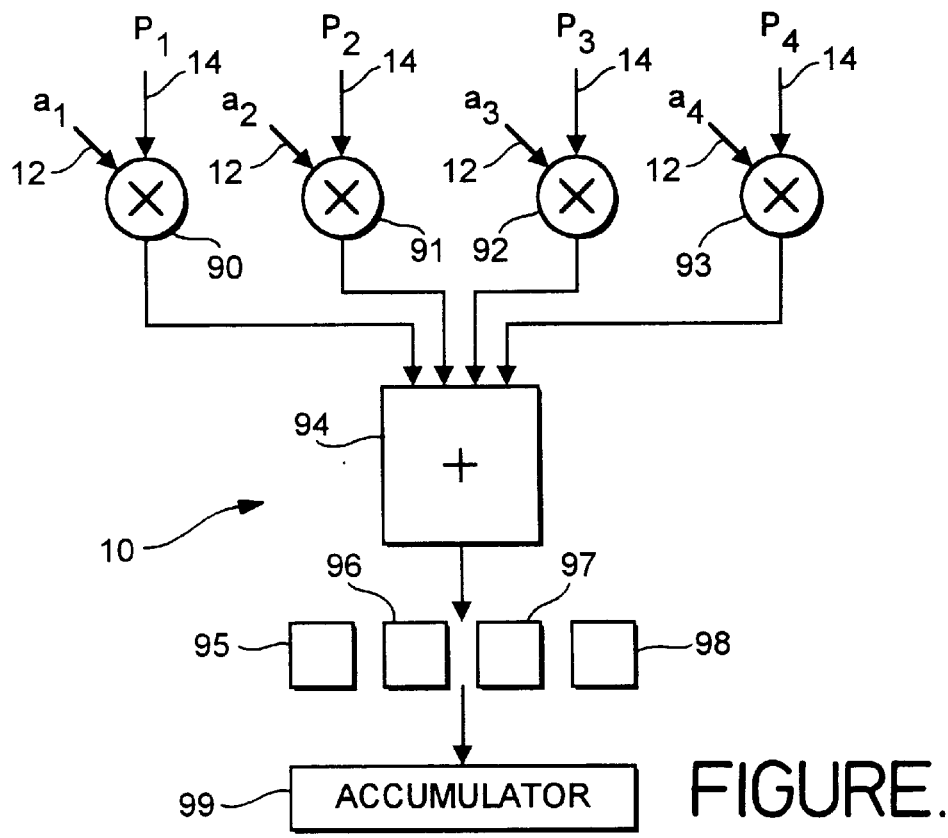
FIG. 10 is a schematic functional block diagram of a filter used in the system of FIG. 1.

As shown in FIG. 10 of the accompanying drawings the filter 10 is formed from a single filtering unit comprising four multipliers 90, 91, 92, 93 and an adder 94 for adding together the outputs from the multipliers. The four multipliers 90, 91, 92, 93 receive respective pixel data $P_1$ to $P_4$ on the bus 14 from the data multiplexer 4 (see FIG. 1) and receive respective coefficient data $a_1$ to $a_4$ on the bus 12 from the filter controller 11. The filter further comprises four register 95 to 98 for temporarily storing intermediate values and an accumulator 99 for accumulating values derived from the intermediate values. The purposes of the temporary registers 95 to 98 and the accumulator 99 will be described in greater detail herein below.

Figure 11:
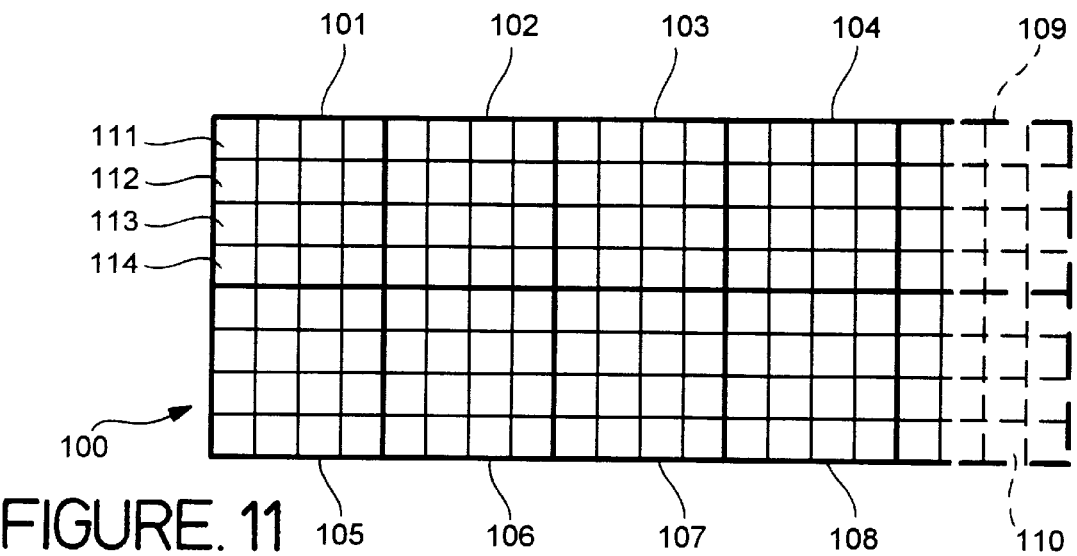
FIG. 11 represents a desired block of data from the store of FIG. 2 to be applied to the filter of FIG. 10.

During a filtering operation, for each destination pixel 81, 82 the filter controller 11 begins by calculating the size of filter required to produce the desired destination pixel. That is to say, the controller 11 determines (in a manner to be described in greater detail herein below) which source pixels contribute to the destination pixel. FIG. 11 of the accompanying drawings shows an exemplary block 100 of 17×8 source pixels which for the purpose of explanation should be considered as having been identified by the controller 11 as contributing to a destination pixel. The block is divided into sub-blocks 101 to 110 of 4×4 pixels. It should be noted that the sub-blocks 101 to 110 correspond in size to the block 65 shown in FIG. 7 and described as being read from the RAM store 2 in a single read cycle. It should also be noted that although the block 100 is only 17 pixels wide, two rows of five sub-blocks (corresponding to a width of 20 pixels) are in fact read from the store.

Data is read from the RAM store 2 under the control of the filter controller 11 a sub-block 101 to 110 at a time.

Figure 12:
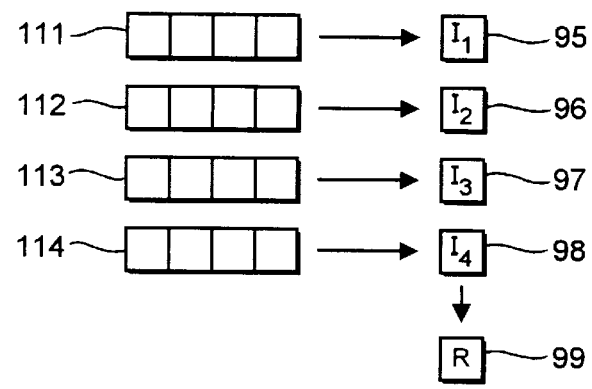
FIG. 12 represents the filtering of lines of data by the filter of FIG. 10.

Considering sub-block 101 with reference to FIGS. 10 to 12, the first line 111 of pixel data in sub-block 101 is input to the filter on lines $P_1$ to $P_4$ of bus 14 and simultaneously coefficients $a_1$ to $a_4$ are input via the bus 12 from the filter controller 11. The pixel data $P_1$ to $P_4$ and the coefficients $a_1$ to $a_4$ are operated on by the multipliers 90 to 93 and the adder 94 to produce an intermediate result $I_1=a_1P_1+a_2P_2+a_3P_3+a_4P_4$. This intermediate result $I_1$ is stored in the register 95. This procedure is repeated for the other three lines 112 to 114 of pixels in the sub-block 101 to produce three further intermediate results $I_2$, $I_3$ and $I_4$ which are stored respectively in registers 96 to 98. The four intermediate results $I_1$ to $I_4$ are then input again to the multipliers 90 to 93 together with respective values $a_1$ to $a_4$ from the filter controller 11 to produce a result $R=a_1I_1+a_2I_2+a_3I_3+a_4I_4$. The result R is input to the accumulator 99 where it is added to whatever value was previously held therein. Of course, instead of using the same multipliers 90 to 93 and adder 94, the filter may comprisea further set of multipliers and a further adder (not shown) after the registers 95 to 98. Such an arrangement would enable the speed of the filter to be increased.

This sequence of calculations is repeated for each of the sub-blocks that comprise the block 100. In the case of sub-blocks 109 and 110 data for 4×4 pixels is read from the store, but for each line the calculation of the intermediate value $I_1$ to $I_4$ proceeds with $a_2$, $a_3$ and $a_4$ set to zero because it is only the first pixel in each line that contributes to the destination pixel. In the event of a partial sub-block overlap in the vertical direction the values of all four coefficient $a_1$ to $a_4$ would be set to zero for rows of pixels not contributing to the destination pixel during the calculation of the intermediate values $I_1$ to $I_4$. Additionally or alternatively appropriate ones of the coefficients $a_1$ to $a_4$ are set to zero when calculating the result R from the intermediate values $I_1$ to $I_4$.

When the calculations have been performed for all of the sub-blocks 101 to 110 the final value in the accumulator will be the value of the destination pixel and that value can therefore be written to the appropriate storage location in the RAM store 2. Similar calculations are performed for every destination pixel in order to produce data representing the required transformed image.

This approach to filtering offers several advantages. Firstly the hardware requirements of the filter 10 are modest. Only a single filtering unit is required which minimises both monetary and board area costs. Secondly, the individual calculations performed by the filtering unit are all simple. This makes it easier to represent the coefficient $a_1$ to $a_4$ since each calculation by the filtering unit is effectively one dimensional. Consequently the coefficients will tend to have larger values than in a corresponding two dimensional calculation and therefore the coefficients can be defined with fewer bits of precision than in the two dimensional case. There is a time penalty resulting from calculating line by line and sub-block by sub-block instead of calculating for the entire block in a single operation, but the simplicity of the individual calculations enables them to be executed quickly thereby minimising the time penalty.

Thirdly, the filter size is readily variable to accommodate different block sizes from the smallest to the largest. Smaller blocks will take less time to process than larger blocks. In a fixed size filter the calculation takes the same length of time regardless of the number of source pixels contributing to a destination pixel, the same larger filter is used with more or less coefficients sets to zero depending on the size of the block. The overall effect of the filter 10 processing smaller blocks more quickly than larger blocks will be to reduce further the time penalty associated with the repeating of calculations. Furthermore, the size of the block is not limited by the size of the filter hardware. The filter hardware is fully utilized virtually all of the time, the only exception being when source pixels contributing to the destination pixel occupy only part of a sub-block (as in the case of sub-blocks 109 and 100 in FIG. 11).

Controlling the Addressing and Filtering

Figure 13:
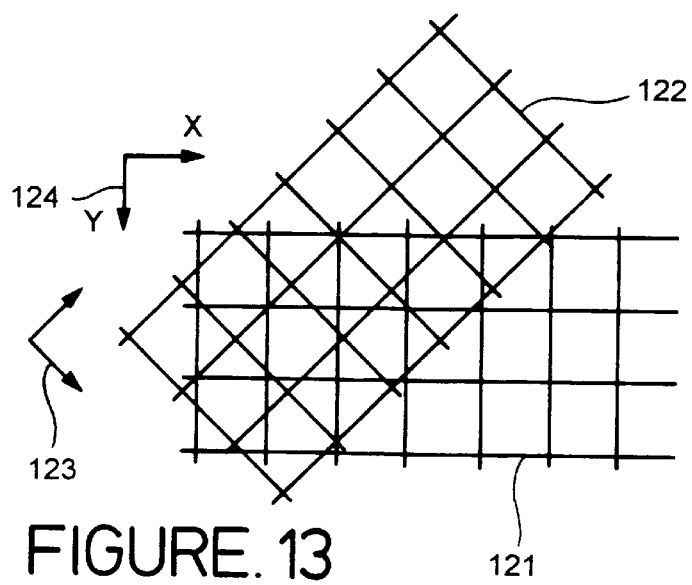
FIG. 13 represents at pixel level a relationship between a source image and a destination image.

The filter controller 11 is shown in greater detail in FIG. 13 of the accompanying drawings. For a given image processing operation, the filter controller 11 must calculate for each destination pixel the degree of compression between the source image and the destination image. If the desired effect is simply to reduce the size of the image so that it occupies only part of a display screen the degree of compression as between the source and destination image will be the same for every destination pixel. If however, the desired effect is a perspective distortion such that as shown in FIG. 9 of the accompanying drawings then the degree of compression both horizontally and vertically will differ between one destination pixel and the next.

In order to achieve a realistic effect transformations are calculated in three dimensional space (x, y, z) and are mapped back into the two dimensional space (x, y) of the image in the store using the techniques described for example in European Patent No. 283159, and corresponding U.S. Pat. No. 4,951,040 the teachings of which are incorporated herein by reference.

Briefly, a read side perspective transform can be described by the matrix $$\begin{pmatrix} a & e & i & 0 \\ b & f & j & 0 \\ c & g & k & 0 \\ d & h & l & 1 \end{pmatrix}$$

and the coordinates of a destination pixel are given by matrix (m, n, 0, 1), where m and n are the x and y-direction screen coordinates respectively. The corresponding source pixel address is found by transforming the destination pixel coordinate by the matrix to give $x_{mn}$=am+bn+d
$y_{mn}$=em+fn+g
$z_{mn}$=im+jn+l The source pixel address is then calculated as $$X_{mn} = \frac{x_{mn}}{z_{mn}}$$

$$Y_{mn} = \frac{y_{mn}}{z_{mn}}$$

It can be seen that x, y and z are linear functions of the destination address (m,n). Therefore given a value of, say, x at position m, n the value at address M+1,n can be found by adding a value dxx=a to x. That is $x_{m+1,n}=x_{mn}+dxx$.

Similarly $x_{m,n+1}=x_{mn}+dxy$ where dxy=b.

Similarly, values of y can be found by addition of the values dyx and dyy, and values of z can be found by additions of the values dzx and dzy the values of dxx etc. are constant for a given transformation matrix.

It can be shown that the amount of compression of the source picture is equal to the rate of change of the source address with a change in the destination address, and at position α=m and β=n is given by the following four equations $$\frac{dX}{d\alpha} = \frac{1}{z_{mn}^2}(z_{0n} \cdot dxx - x_{0n} \cdot dzx) \quad (1)$$

$$\frac{dX}{d\beta} = \frac{1}{z_{mn}^2}(z_{m0} \cdot dxy - x_{m0} \cdot dzy) \quad (2)$$

$$\frac{dY}{d\alpha} = \frac{1}{z_{mn}^2}(z_{0n} \cdot dyx - y_{0n} \cdot dzx) \quad (3)$$

$$\frac{dY}{d\beta} = \frac{1}{z_{mn}^2}(z_{m0} \cdot dyy - y_{m0} \cdot dzy) \quad (4)$$

FIG. 13 of the accompanying drawings represents the relationship between pixels in a portion 121 of the source image and pixels in a corresponding portion 122 of the transformed or destination image. The above four equations define the degree of compression along the axes 123, ie with reference to the transformed image. The data that is used in the transformation is, however, that of the source image whose pixels are at coordinates along the axes 124. It is not a simple calculation to convert from compression along the axes 123 to compression along the axes 124 and with presently available technology such a calculation is too lengthy to be effected sufficiently fast to enable processing at the required rate. An acceptable approximation can however be calculated as follows.

$$X_{comp} = \sqrt{\left(\frac{dX}{d\alpha}\right)^2 + \left(\frac{dX}{d\beta}\right)^2} \quad (5)$$

$$Y_{comp} = \sqrt{\left(\frac{dY}{d\alpha}\right)^2 + \left(\frac{dY}{d\beta}\right)^2} \quad (6)$$

At the beginning of a transformation operation the host transfers information to the transputer 5 (see FIG. 1) defining the required transformation. (The host may receive its information from a user interface in a manner similar to that described in our European Patent No. 283159, for example). The information from the host enables the microprocessor 5 to determine the degree of compression and thus the rate of change of x, y and z in the image. That is to say the information from the host enables the transputer to solve the equations (1) to (6) for x, y and z. Start values $x_0$, $y_0$ and $z_0$ and the respective incremental values to enable x, y and z to be calculated are input to the addressing portion of the filter controller 11.

Figure 14:
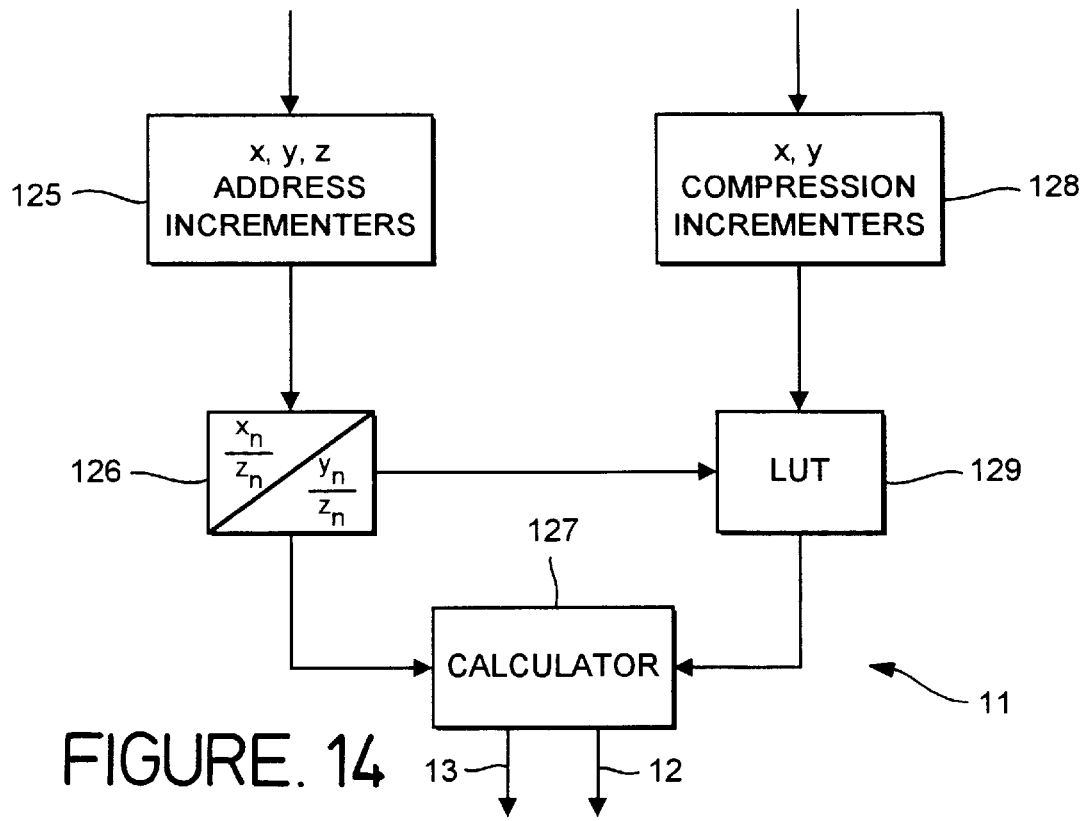
FIG. 14 is a schematic functional block diagram of a filter control unit used in the system of FIG. 1.

As shown in FIG. 14, the filter controller 11 comprises a set of x, y, z address incrementers 125 which together with a divider circuit 126 constitutes the addressing portion of the controller 11. The x, y, z address incrementers 125 calculate from the start values $x_{on}$, $y_{on}$, $z_{on}$ and their respective increments dxx, dyx, dzx values for x, y and z for each pixel in the transformed image. With this information the coordinates (X, Y) in the source image for each pixel in the transformed image is calculated from X=x/z and Y=y/z, by the divider circuit 126. The address (X, Y) output from the dividers circuit 126 defines the position of the centre of the required block of data and may comprise both an integer part and a fractional part. Pixels in the source image are of course stored at integer address locations. The fractional part indicates the degree of interpolation that is required and is therefore used in the calculation of filter coefficients. The controller further comprises a calculator 127 which receives the output from the divider circuit 126.

The microprocessor 5 also calculates values for use in the data controlling portion of the filter controller 11. The controller 11 comprises x, y compression incrementers 128 which receive x, y and compression data to enable the correct filter coefficients for a given destination pixel to be selected from a look up table 129. As mentioned hereinbefore filtering and interpolation may be effected in a single operation simply by increasing (by one) the number of coefficients in the operation. The fractional address from the divider circuit 126 is therefore input together with the data from the x, y compression incrementers 128 to the look up table 129. The look up table 129 contains predetermined sets of coefficients for use by the filter 10 to effect respective different degrees of compression by filtering and interpolating the image data. For a given effect the degree of compression may well vary between adjacent pixels.

It is of course possible to calculate for each destination pixel the degree of compression, but such calculations are complex and expensive to implement in terms of hardware. An alternative approach which gives a satisfactory result without requiring any extra hardware is to determine the degree of compression for some pixels and to use that information to estimate the compression for other pixels. The degree of compression for a few selected pixels in a line the destination image is calculated in advance by the microprocessor 5. At the beginning of the addressing of a line in the destination image, values of x, y and their respective increments are loaded into the incrementers 128 together with compression data for the first pixel in the line and a compression increment value corresponding to the rate of change of compression along the line. For the purpose of calculation it is assumed that the compression changes linearly between two consecutive selected pixels. This enables the compression increment to be calculated simply by interpolating between the compression values for consecutive selected pixels. The spacing between selected pixels will of course depend on the speed at which the transputer can operate, but typically a spacing of about 50 pixels will provide the required speed without unduly compromising accuracy.

The coefficients from the look up table 129 are in the form suitable for a conventional n x m filter. The calculator 127 is therefore arranged to convert the coefficient data from the look up table into coefficient data suitable for the filter calculations described hereinabove with reference to FIGS. 10, 11 and 12 of the drawings. The thus calculated coefficient data is output from the calculator 127 to the filter 10 via bus 12. The calculator 127 also calculates, from the (x, y) address data from the dividers 126 and from the compression increments, the addresses of all sub-blocks (see FIG. 11) that comprise the required block of data. Each sub-block comprises 4×4 pixels which will overlap several patches of data in the RAM store 2. The calculator 127 therefore performs the calculations described herein with reference to FIGS. 4 to 7 to ensure that the correct addresses are applied to each RAM device for the required block of data. The addresses calculated by the block calculator 127 are transferred via bus 13 to the address multiplexer shown in FIG. 1.

Read-side/Write-side Processing

Image processing can be effected to data either as a read-side or as a write-side processing operation. In write-side processing the store containing the source pixel data is read out in scan order. Such source pixel will contribute to a number of pixels in the destination image and therefore as a source pixel is read from the store the contribution that the pixel makes to all pixels in the destination image is calculated. Those contributions are then written by random access to appropriate locations in the destination image store. This procedure is repeated for each pixel as it is scanned out of the source image store. In read-side processing the store containing the data representing the destination pixels is addressed in scan order. Each destination pixel comprises contributions from a number of pixels in the source image and therefore for each destination pixel the contributions that it should receive from each pixel in the source image is calculated. Those contributions are then read by random access from appropriate locations in the source image store. In other words, in write-side processing the writing of data to the destination store is by random access and in read-side processing the reading of data from the source store is by random access.

Conceptually read-side processing is easier to explain and understand than write-side processing. For this reason the above description is of a system based on read-side processing. It will however be appreciated that so far as the processing is concerned there is no difficulty in performing either read-side or write-side processing because the mathematical operations of one are simply the inverse of the other. Read-side or write-side processing can be effected equally well using the above described system.

Building and Testing the System

In the foregoing the system has been described in terms of separate functional units each dedicated to a particular task. It is of course possible to design and build circuits that will perform each of the particular functions required of the functional units. In high volume production such circuits are cost effective, but in medium and small volume production they are expensive. The circuits can however be implemented by way of programmable logic devices. Altera Corporation produce a range of SRAM-based flexible logical element matrix devices which are well suited to use in the above described system. Altera's programmable logic devices each comprise a large matrix of logic elements each containing a look up table that provides combinational logic capability and a programmable register that offers sequential logic capability. A useful feature of Altera's programmable logic devices is that they can be reconfigured in-circuit in a relatively short period of time, typically 100 mS. This adds a further degree of flexibility to the system 1. In addition to facilitating the design of new filtering operations, the reprogrammability enables a degree of self-testing by the system 1.

If the system 1 is implemented by programmable logic devices, then a large number of such devices will be used. Depending on the particular model, each device comprises some 100 input/output pins. Pins on the programmable logic devices can be selected to operate as an input, as an output or can be switched off (tri-state). Some of the pins will be connected to input/output pins on other devices such as the transputer 5. However, a large number of the pins on one programmable logic device will be connected only to similar pins on other programmable logic devices or to pins on other devices having a tri-state facility.

Figure 15:
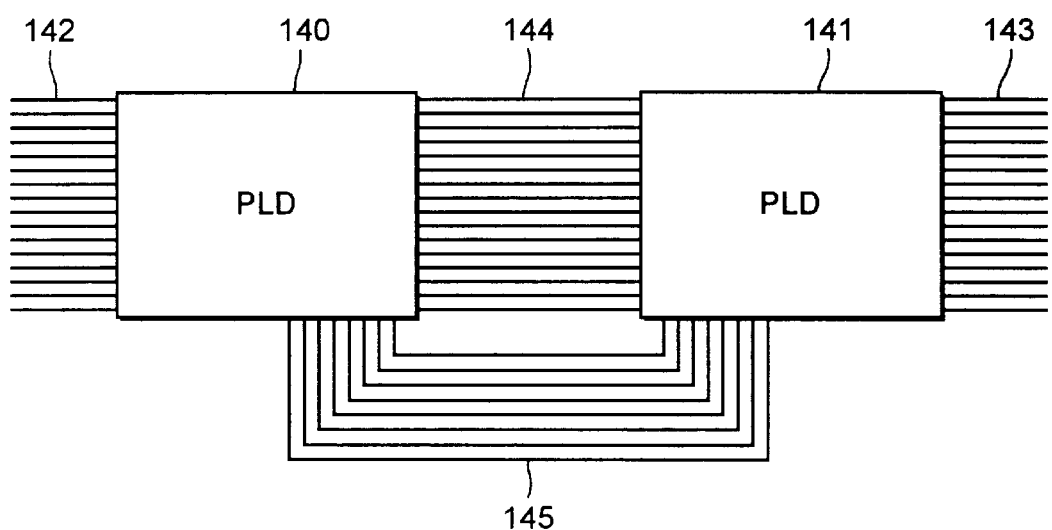
FIG. 15 is a schematic block diagram showing two programmable logic devices used in the system of FIG. 1.
Figure 16:
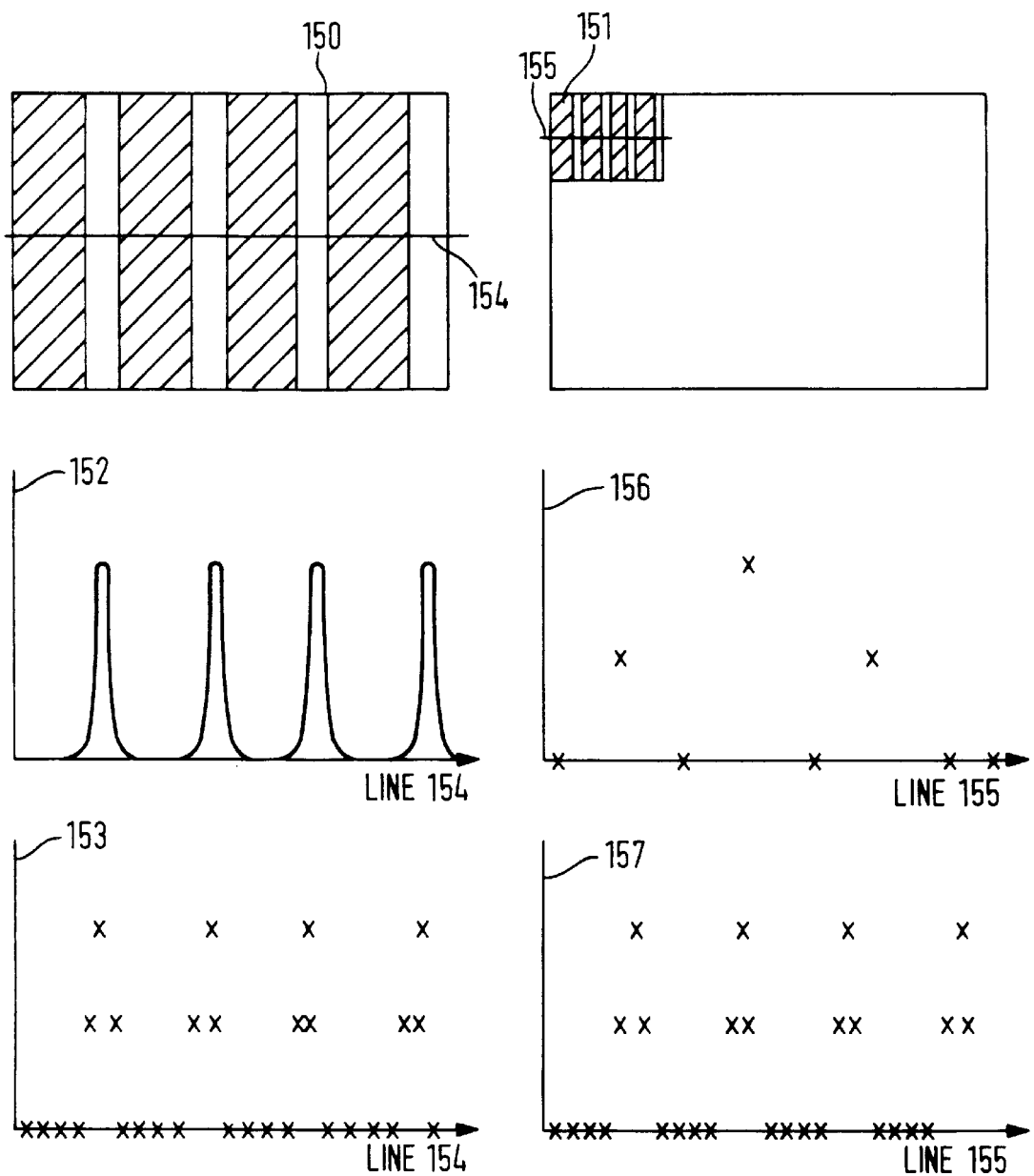
FIG. 16 shows signals and data representing two versions of an image as previously described herein above.

FIG. 15 of the accompanying drawings shows two programmable logic devices 140, 141. Each device has a number of pins 142, 143 connected to other devices (not shown) within the system 1. The programmable logic devices 140, 141 share a large number of common lines 144, 145. The common lines may be connected to other programmable logic devices or to pins on other devices having a tri-state capability (not shown), but they are not connected to any other type of device within the system 1. The programmable logic device pins associated with these lines 144, 145 can be used to test open circuits on or short circuits between the lines.

Short circuits tests can be executed without any cooperation between the programmable logic devices 140, 141. For each short circuit test therefore only one programmable logic device is active and the pins of all other devices are switched off (tri-state). In the following description of the short circuit test the operation of three pins will be described, but it will be appreciated that the principle can be applied to as few as two pins or indeed simultaneously to as many as all of the testable pins on a programmable logic device.

The programmable logic device is programmed so that in the short circuit test three adjacent pins A,B,C are selected as outputs and a voltage of 5 volts is output on each pin. Next, the middle pin B is switched off (tri-state). Then 0 volts is applied to the other two pins A, C. The middle pin B is selected as an input and the voltage on the pin B is examined. A tri-state buffer includes some capacitance and in the short time of the test the voltage on pin B should have remained at approximately 5 volts. If the voltage on pin B is 0 volts, then this indicates that there is a short circuit from pin B to pin A and/or pin C. The programmable logic device can be programmed to respond to the detection of a short circuit by transmitting a signal back to the transputer 5 controlling it.

During the short circuit testing of one programmable logic device all other programmable logic devices are switched off (tri-state). Once the short circuit test has been performed on every testable pin of a given programmable logic device, that device is switched off (tri-state) and the test is performed on another programmable device. The test so continues until all programmable logic devices has been tested for short circuit connections between pins. Alternatively or additionally, the test may be performed with the voltage levels reversed. That is with a voltage of 0 volts first being applied to the three output pins followed by a voltage of 5 volts to the two output pins.

Testing for open circuits along the lines 144, 145 requires cooperation between programmable logic devices connected by the lines. The basic test is to select one pin on one programmable logic device as an output pin and to select as input pins all other pins on the one programmable logic device and on all other programmable logic devices which should be connected to the output pin by a common line. Alternatively the other pins can be selected one at a time. Initially the voltages on all pins are set to zero. 5 volts is then applied to the output pin and the voltage on the input pins is examined. If the voltage on any of the input pins has not risen to 5 volts, then that indicates an open circuit along the common line. The programmable logic devices can be programmed to send a signal back to the controlling microproessor when they detect a 5 volt input, any open circuit thereby being identified by the absence of a signal. Again, it is possible to reverse the order in which the voltages are applied to the output pin, ie 5 volts first and then 0 volts. Alternatively or additionally a signal comprising a number of transitions between a high and a low voltage can be output along the common line.

More sophisticated tests can be applied if desired. For example, selecting a single pin as an output pin and all other testable pins on all other programmable logic devices as inputs would enable input connections to be identified during the development of a circuit board.

Such tests are of value in the development stage. The confidence of such tests can be increased by using the aforementioned signal comprising a number of transitions between high and low. In many circuits track density is so great that cross talk can occur between adjacent tracks as the signal changes between a high value and a low value. Cross talk can result in the signal being detected at pins to which there is, in fact, no direct connection. This problem can be overcome by arranging for each logic device to monitor for transitions on each of its pins. When a transition is detected on a pin, the device is arranged to change the pin briefly from an input to an output and then back again. While the pin is briefly an output pin an output voltage opposite to the direction of the transition is applied to the pin. If the pin is truly connected to the source of the signal then the voltage on the pin will return to that of the signal when the pin is changed back to an input pin. However, if the pin is merely receiving a cross talk signal then the voltage on the pin will remain at or near the voltage that was applied when the pin was briefly an output pin. In this way true signals can be distinguished from cross talk signals. Connecting two or more output pins together and driving the same simultaneously can damage the output stages of the pins if the driving is prolonged. However, no damage will occur during the test if the change in status of the pins from input to output and back again is kept as brief as possible.

Having thus described the invention by reference to a preferred embodiment it is to be well understood that the embodiment in question is exemplary only and that modifications and variations such as will occur to those possessed with appropriate knowledge and skills may be made without departure from the spirit and scope of the invention as set forth in the appended claims and equivalents thereof.

I claim:

1. An image processing system for effecting a predetermined transformation to data representing a multiplicity of pixels which together form an initial image so as to create data representing a multiplicity of pixels which together form a transformed image in which each pixel is formed as a weighted combination of pixels in a respective block of data in the initial image, the system comprising:

a controller operable for each pixel in the transformed image to identify the block of data containing all pixels in the initial image that contribute to the transformed image pixel, to divide the block into a plurality of sub-blocks each comprising a plurality of rows of pixel data and plurality of columns of pixel data, and to calculate for each sub-block a set of transformation coefficients depending on the predetermined transformation;

a transforming unit for applying the respective transformation coefficients to each sub-block of data in order to produce an intermediate value for each sub-block; and an accumulator for accumulating the intermediate values from the transforming unit such that once the transforming unit has applied the transformation coefficients to every sub-block in the initial image data block the accumulated value in the accumulator comprises the data defining the transformed image pixel, and wherein the controller is arranged for each sub-block to control the transforming unit to apply respective transformation coefficients to each row of pixel data in the sub-block one row at a time in order to produce data representing for each row a partial result and, once transformation coefficients have been applied to every row in the sub-block, to produce data representing a set of partial results, and to apply transformation coefficients to the set of partial results in order to produce said intermediate result.

2. An image processing system as claimed in claim 1, wherein the transforming unit comprises a digital filter.

3. An image processing system as claimed in claim 2, wherein the digital filter is two dimensional.

4. An image processing system as claimed in claim 1 wherein the controller comprises an address generator for generating addresses identifying pixels in the initial image and pixels in the transformed image.

5. An image processing system as claimed in claim 4, wherein the controller comprises a look up table containing data representing plural sets of predetermined transformation coefficients, the look up table being arranged to output data representing a set of transformation data selected depending on the predetermined transformation and on addresses generated by the address generator.

6. An image processing system as claimed in claim 5, wherein the controller comprises a calculator for calculating for each sub-block from the transformation data output from the look up table a set of transformation coefficients for each line in the sub-block and for the set of partial results.

7. An image processing system as claimed in claim 4, wherein the address generator is arranged to generate three dimensional addresses and the controller comprises a converter for converting the three dimensional addresses into two dimensional addresses that enable pixels to be identified in the initial and transformed images.

8. An image processing system as claimed in claim 1, further comprising a random access store for storing image data.

9. An image processing system as claimed in claim 8, wherein data representing at least the initial image is stored in the random access store and the predetermined transformation is effected by the system by way of a read side processing operation.

10. An image processing system as claimed in claim 8, wherein data representing at least the transformed image is stored in the random access store and the predetermined transformation is effected by the system by way of a write side processing operation.

11. An image processing system as claimed in claim 8, wherein the image data is stored in the store as a one-dimensional list.

12. An image processing system as claimed in claim 1, wherein the transformation unit comprises a finite impulse response filter.

13. A method of filtering digital data representing a first plural-dimensional array of elements to produce data representing a second plural-dimensional array of elements, the method comprising:

identifying for each element of the second array a plural-dimensional block of data comprising elements in the first array that contribute to the elements in the second array;

dividing the identified block of data into a plurality of plural-dimensional sub-blocks of data each comprising a plurality of rows of elements and a plurality of columns of elements;

calculating for each sub-block a set of filtering coefficients;

applying the filtering coefficients to respective elements in the sub-block in order to produce an intermediate value for each sub-block; and accumulating the intermediate values whereby, once the filtering coefficients have been applied respectively to every sub-block of the block of data, the accumulated value comprises the data of the elements, and wherein filtering coefficients are applied to each row of elements in the sub-block one row at a time, in order to produce data representing for each row a partial result, and once transformation coefficients have been applied to every row in the sub-block, to produce data representing a set of partial results, and filtering coefficients are applied to the set of partial results in order to produce said intermediate result.

14. A method as claimed in claim 13, wherein each array of elements is two dimensional.

15. A method as claimed in claim 13, wherein the set of filtering coefficients for each sub-block are calculated from predetermined sets of coefficients for differently sized plural-dimensional blocks.

16. A method as claimed in claim 13, wherein each element in the arrays comprises a pixel, the first array of data defining an initial picture and the second array of data defining a filtered picture.

17. A method as claimed in claim 13, further comprising storing the data of each array of elements as a one-dimensional list.

* * * * *